United States Patent [19]
Hashimoto

[11] 4,232,841
[45] Nov. 11, 1980

[54] MAGNETIC RECORDING TAPE CASSETTE

[75] Inventor: Noritsugu Hashimoto, Takaoka, Japan

[73] Assignee: Hitachi Maxell, Ltd., Osaka, Japan

[21] Appl. No.: 951,147

[22] Filed: Oct. 13, 1978

[30] Foreign Application Priority Data

Oct. 14, 1977 [JP] Japan .......................... 52-138154[U]

[51] Int. Cl.³ .............................................. G11B 23/10
[52] U.S. Cl. .................................................. 242/199
[58] Field of Search ..................... 242/199, 200, 198; 360/132, 96

[56] References Cited

U.S. PATENT DOCUMENTS 3,912,194  10/1975  Chan ..................................... 242/199
4,011,592  3/1977  Kawada ............................... 242/199
4,076,186  2/1978  Oishi et al. .......................... 242/199

Primary Examiner—Harvey C. Hornsby
Attorney, Agent, or Firm—Birch, Stewart, Kolasch & Birch

[57] ABSTRACT

The present invention is directed to a magnetic recording tape cassette having a bottom case and a top case, both of the cases being assembled and fastened together by means of screws threadingly engaged in holes provided in each of the bosses disposed on the front corners of the bottom case. The respective bosses on the bottom case are provided with at least one rib extending therefrom with a predetermined width and length, thereby reinforcing the bosses.

6 Claims, 9 Drawing Figures

MAGNETIC RECORDING TAPE CASSETTE

The present invention relates to a magentic recording tape cassette, more particularly to a cassette wherein top and bottom cases are fixedly assembled together by means of a plurality of screws which are threadingly engage in respective holes located in bosses formed on each of the corners of the cases.

Figure 1:
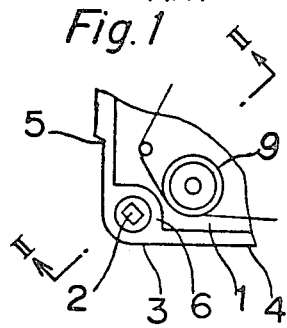
Figure 2:
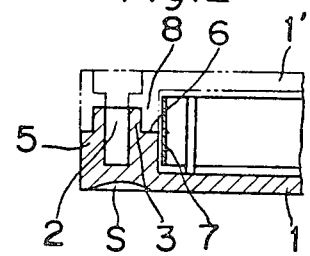

In the conventional magnetic recording tape cassette as shown in FIGS. 1 and 2, bottom and top cases 1, 1' are assembled and tightened together by means of screws engaged in the holes 2 located in each of bosses 3 formed at the respective corners of a cassette where both ends of a front wall 4 and side walls 5 meet together at right angles. In order to reinforce the mechanical strength of the bosses 3, there are provided reinforcing walls 6 extending between the front wall 4 and one of the side walls 5 around the base of the respective bosses 3.

However, when a thick reinforcing wall is formed, there is a tendency to form a sink mark S, during the molding of the case, as shown in FIG. 2, in that portion of the surface of the bottom wall opposing the boss 3. This is derogatory to the appearance of the magnetic recording tape cassette, and in an extreme case, this leads to deformation of the cassette, making it difficult for a magnetic recording tape to be guided correctly. Moreover, the thick reinforcing wall has the drawback that a longer time is required when molding the cassette and thus the period of the molding cycle is extended. Also a higher pressure for projection molding is required, thus adversely effecting the metal mold.

Figure 3:
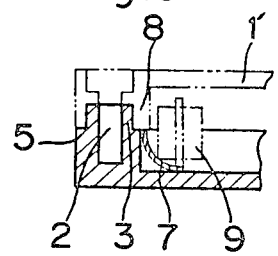

On the other hand, if the reinforcing wall is omitted or the thickness thereof is reduced, the mechanical strength of the boss 3 is lowered, whereby the boss is readily broken or deformed by the screw action of the assembly screws. In addition, there are such drawbacks that when a magnetic recording tape 7 is loaded in the bottom case 1 and the top case 1' is assembled thereon, the lateral edge of the magnetic recording tape 7 may be caused to contact the outer periphery of the boss 8 of the top case 1' to cause deformation of the tape. Alternatively the tape may be forced into the space defined between a guide roller 9 and the bottom wall 1 as shown in FIG. 3.

Accordingly, it is an essential object of the present invention to provide a magnetic recording tape cassette which is capable of eliminating the drawbacks inherent in the conventional tape cassette, that is by providing a cassette which is strong.

It is another object of the present invention to provide a magnetic recording tape cassette in which the mechanical strength of the bosses for receiving screws is preserved, and the formation of a sink mark in the bottom wall of the cassette during the molding operation, is eliminated.

It is a further object of the present invention to provide a magnetic recording tape cassette which can prevent the magnetic recording tape from being deformed or being forced into the bottom portion of a guide roller.

Figure 4:
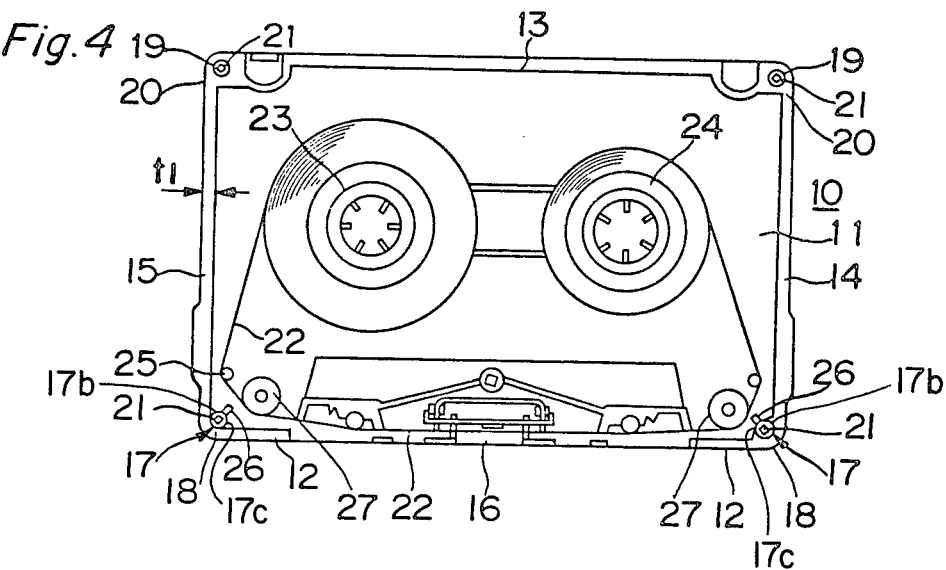
Figure 5:
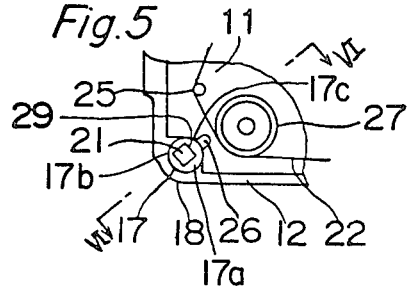
Figure 6:
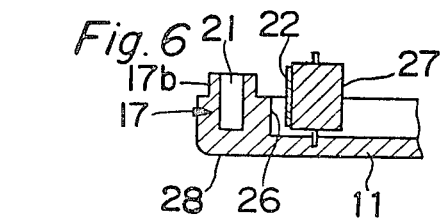
Figure 7:
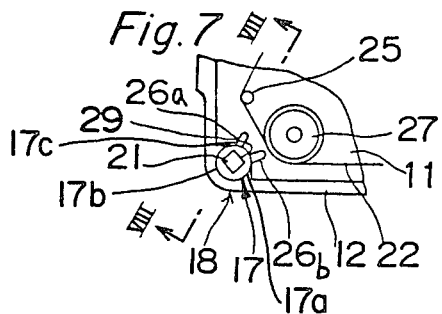
Figure 8:
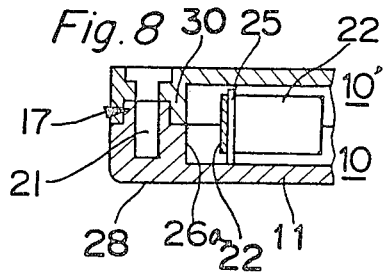
Figure 9:
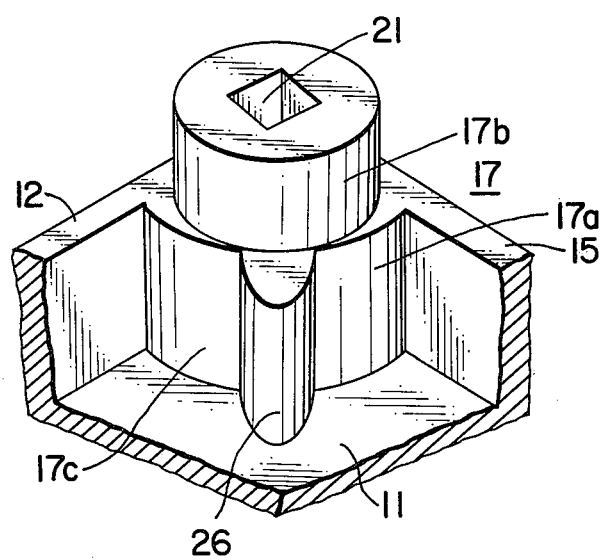

These and other objects and features of the present invention will be apparent from the following description made in reference to the appended drawings in which;

FIG. 1 is a plan view showing a part of a conventional magnetic recording tape cassette, FIG. 2 is a vertical cross-section taken along a plane II—II of FIG. 1 showing a drawback inherent in the conventional cassette, FIG. 3 is a vertical cross-section similar to FIG. 2 showing another drawback inherent in a cassette, wherein a reinforming wall is omitted, FIG. 4 is a plan view of a magnetic recording tape cassette according to the present invention with its top case removed, FIG. 5 is a plan view of an essential portion of the magnetic recording tape cassette shown in FIG. 4, FIG. 6 is a cross-sectional view of FIG. 5 taken along a plane VI—VI, FIG. 7 is a plan view showing an essential portion of another embodiment of the present invention, and FIG. 8 is a cross-section taken along a plane VIII—VIII of FIG. 7, FIG. 9 is a perspective view showing the boss employed in the embodiment of FIG. 1.

Referring to FIGS. 4 through 6, a bottom case 10 of a magnetic recording tape cassette formed by molding plastics such as polystylene resin comprises a bottom wall 11, a front wall 12, a rear wall 13 and side walls 14 and 15.

The front wall 12 is formed with a number of openings, one of which includes the opening 16 which receives a magnetic recording/playback head.

The bottom case 10 further comprises two bosses 19 at respective corners 20 of the rear side thereof and two bosses 17 formed at respective corners 18 of the front side of the bottom case 10 where one end of the front wall 12 and the side wall 14, and other end of the front wall 12 and the side wall 15 meet, respectively, at right angles.

The bottom case 10 is assembled with a top case 10' (see FIG. 8) formed generally similar to the bottom case 10 to form a cassette having a tape chamber in a known manner, each of the connecting columns 17b being engaged within the corresponding hole defined in the boss of the top case 10 and the top and bottom cases 10 and 10' are secured together by means of screws (not shown) extending through the top case 10' and threadingly engaging the screw holes 21 defined in the respective bosses 17 and 19.

The cassette contains a magnetic recording tape 22 wound around a pair of reels 23 and 24 mounted on the inner surface of the bottom wall 11. The recording tape 22 runs along the inside of the front wall 12 passing through guide pins 25 and guide rollers 27 disposed adjacent to the front corners 18.

A rib 26 extends internally from each of the arcuate walls 17c of the base part 17b of the bosses 17, formed at the front corners 18, at an angle sufficient to substantially equally bisect the angle defined between the front wall 12 and the side walls 14 or 15.

Each rib 26 rises from the bottom wall 11 and is formed integrally with the bottom wall 11 and each of the bosses 17.

Said rib 26 has a thickness tl of the peripheral walls 12, 14 or 15.

Thus, because each of the bosses 17 is molded in a volume as small as possible, the formation of a sink mark on the reverse surface 28 of the bottom wall 11 is suppressed, and the mechanical strength of the boss 17 can be sufficiently maintained by the rib 26. Each of said bosses 17 situated adjacent to the front wall 12 of the bottom case 10 is composed of a bse part 17a having an arcuate wall 17c extending between the inside faces of the front wall 12 and one of the side walls 15 or 16 and a circular connecting column 17b projected from the top face of the base part so as to be engaged within the hole defined in the corresponding boss 30 situated in the top case 10'. A part of peripheral face of the connecting column 17b is formed so as to be aligned with the arcuate wall 17c.

In the event that one rib 26 is formed for each of the bosses, the rib 26 is formed at an angle sufficient to substantially equally bisect the angle defined between the front wall 12 and the side wall 15 as shown in the embodiment of FIG. 5, which serves to reinforce the boss 17 most effectively.

The larger the number of the ribs 26, the more improved is the mechanical strength of the boss 17. On the contrary, when the number of the ribs 26 of one boss is increased and the volume of the ribs becomes larger, there is an increased tendency that the sink mark may be formed. For this reason, the number of the ribs to be formed at the inside of the corner portion defined by the walls 12 and 15 is about 1 to 3.

It is suitable to form the rib 26 so as to have its thickness and length of protrusion from the boss 17 nearly the same as the thickness of the above peripheral walls 12, 14 and 15 and its height nearly the same as the height of the peripheral walls 12, 14 and 15, whereby the formation of the sink mark is suppressed and a desirable mechanical strength should be imparted to the boss 17.

It is appreciated that since the rib 26 extends to such a position that the projected end of the rib 26 aligns with the peripheral face of the boss 30 formed at the corner of the top case 10', even if a recording tape is loosened at the time of its loading into the cassette, the recording tape 22 is prevented from any likelihood of becoming twisted by the lower edge of the top case 1' as shown in FIG. 3.

As to the screw hole 21 in the boss 17, the use of a square hole is recommended which permits screwing with ease and at the same time accommodates the cut powder produced due to the screwing operation. In the case of adopting the square hole, the mechanical strength of the boss 17 around the side 29 tends to become weak. Therefore, it is preferred to provide the rib 26 on the boss 17 at a the position opposite to the side 29.

A modified embodiment according to the present invention is shown in FIGS. 7 and 8. In this embodiment, two ribs 26a and 26b are formed separately at an angle which substantially equally trisects the angle defined between the front wall 12 and side walls 14 or 15.

By adopting the construction as above, not only the mechanical strength of the boss 17 is increased but the entry of the magnetic recording tape 22 which becomes loose through the guide member 25 or 27, into the space around the each of the corners 17, is securely inhibited, thereby preventing the magnetic recording tape 22 from becoming damaged.

The magnetic recording tape cassette according to the present invention is likewise applicable to a cassette of a type wherein the recording tape is drawn out from the front opening 16, and runs along guide means provided on the outside of the cassette.

What is claimed is:

1. A magnetic recording tape cassette comprising top and bottom cases, each of the cases having a front wall with a plurality of openings, a rear wall and side walls; a plurality of bosses formed adjacent to the respective corners of the cases, said cases being assembled together by means of screw passing through holes disposed in the respective bosses, said assembled cases defining a chamber therebetween for receoving a magnetic recording tape, each of said bosses situated adjacent to the front wall of the bottom case being composed of a base part having an arcuate wall extending between the inside faces of the front wall and one of the side walls and a circular connecting column projected from the top face of the base part so as to be engaged within the hole defined in the corresponding boss situated in the top case, a part of the peripheral face of the connecting column being formed so as to be aligned with the arcuate wall, and at least one rib with a predetermined thickness formed integral with each of the bosses situated adjacent to the front wall of the bottom case so as to project radially from the corresponding arcuate wall.

2. The magnetic recording tape cassette according to claim 1, wherein said bosses are formed in the bottom case at the right-angled corners defined by the side walls and the front wall.

3. The magnetic recording tape cassette according to claim 2, wherein each of said ribs is formed on the bottom case and extends at an angle sufficient to substantially bisect the angle defined by the front wall and the respective side walls.

4. The magnetic recording tape cassette according to claim 2, wherein the screw receiving hole disposed in each of said bosses is a square-sectioned hole, and said rib is formed at the position opposite to a side of said square-sectioned hole.

5. The magnetic recording tape cassette according to claim 2, wherein two ribs are formed on the bottom case and extend at angles sufficient to substantially trisect the angle defined by the front wall and the respective side walls.

6. The magnetic recording tape cassette of claim 1 containing a magnetic recording tape having its opposed portions wound on respective reels rotatably mounted within the chamber, a substantially intermediate portion of said tape extending through the openings of the front wall, said magnetic recording tape being loaded between guide means disposed adjacent to the corners of the front wall.

* * * * *